US009772992B2

(12) United States Patent
Cucerzan et al.

(10) Patent No.: US 9,772,992 B2
(45) Date of Patent: Sep. 26, 2017

(54) AUTOMATIC DISAMBIGUATION BASED ON A REFERENCE RESOURCE

(75) Inventors: Silviu-Petru Cucerzan, Redmond, WA (US); Mike Schultz, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 422 days.

(21) Appl. No.: 13/342,285

(22) Filed: Jan. 3, 2012

(65) Prior Publication Data
US 2012/0102045 A1    Apr. 26, 2012

Related U.S. Application Data (63) Continuation of application No. 11/710,805, filed on Feb. 26, 2007, now Pat. No. 8,112,402.

(51) Int. Cl.
*G06F 17/27* (2006.01)
(52) U.S. Cl.
CPC .................... *G06F 17/278* (2013.01)
(58) Field of Classification Search
USPC ................................ 707/748, 790
See application file for complete search history.

(56) References Cited

U.S. PATENT DOCUMENTS 5,541,836 A   7/1996  Church
5,844,798 A  12/1998  Uramoto (Continued)

FOREIGN PATENT DOCUMENTS

JP       10171806      10/1998
KR     19990086011    12/1999

(Continued)

OTHER PUBLICATIONS

Name Discrimination and Email Clustering using Unsupervised Clustering and Labeling of Similar Contexts (Kulkarni adn Pedersen)—Appears in the Proceedings of the Second Indian International Conference on Artificial Intelligence, Dec. 20-22, 2005, Pune, India.

(Continued)

*Primary Examiner* — Mohammad S Rostami
*Assistant Examiner* — Allen Lin
(74) *Attorney, Agent, or Firm* — Christopher J. Volkmann; Kelly, Holt & Christensen, PLLC (57) ABSTRACT

A novel system for automatically indicating the specific identity of ambiguous named entities is provided. An automatic disambiguation data collection is created using a reference resource. Explicit named entities are catalogued from the reference resource, together with various abbreviated, alternative, and casual ways of referring to the named entities. Entity indicators, such as labels and context indicators associated with the named entities in the reference resource, are also catalogued. The automatic disambiguation collection can then be used as a basis for evaluating ambiguous references to named entities in text content provided in different applications. The content surrounding the ambiguous reference may be compared with the entity indicators to find a good match, indicating that the named entity associated with the matching entity indicators is the intended identity of the ambiguous reference, which can be automatically provided to a user.

20 Claims, 5 Drawing Sheets

(56) References Cited

U.S. PATENT DOCUMENTS

| | | | |
|---|---|---|---|
| 5,873,056 A | 2/1999 | Liddy | |
| 5,878,421 A | 3/1999 | Ferrel | |
| 5,930,788 A * | 7/1999 | Wical | G06F 17/30707 |
| 6,081,774 A * | 6/2000 | de Hita | G06F 17/30663 704/9 |
| 6,138,116 A | 10/2000 | Kitagawa | |
| 6,256,629 B1 | 7/2001 | Sproat | |
| 6,260,008 B1 | 7/2001 | Sanfilippo | |
| 6,405,162 B1 | 6/2002 | Segond | |
| 6,975,766 B2 | 12/2005 | Fukushima | |
| 7,024,407 B2 | 4/2006 | Bradford | |
| 7,031,909 B2 | 4/2006 | Mao | |
| 7,225,184 B2 | 5/2007 | Carrasco | |
| 7,503,007 B2 | 3/2009 | Goodman | |
| 7,734,623 B2 | 6/2010 | Witbrock | |
| 8,112,402 B2 | 2/2012 | Cucerzan et al. | |
| 2001/0029455 A1* | 10/2001 | Chin et al. | 704/277 |
| 2002/0143871 A1 | 10/2002 | Meyer | |
| 2003/0028367 A1 | 2/2003 | Chalabi | |
| 2003/0028564 A1 | 2/2003 | Sanfilippo | |
| 2003/0061025 A1 | 3/2003 | Abir | |
| 2003/0171910 A1 | 9/2003 | Abir | |
| 2004/0093331 A1* | 5/2004 | Garner et al. | 707/3 |
| 2004/0172247 A1 | 9/2004 | Yoon | |
| 2004/0230898 A1 | 11/2004 | Blakely | |
| 2004/0236725 A1 | 11/2004 | Amitay | |
| 2005/0049852 A1 | 3/2005 | Chao | |
| 2005/0080613 A1* | 4/2005 | Colledge | G06F 17/2785 704/9 |
| 2005/0080795 A1 | 4/2005 | Kapur | |
| 2005/0108001 A1 | 5/2005 | Aarskog | |
| 2005/0279325 A1 | 12/2005 | Suzuki | |
| 2006/0117052 A1 | 6/2006 | Bradford | |
| 2006/0136147 A1 | 6/2006 | Jang | |
| 2006/0136196 A1 | 6/2006 | Brun | |
| 2006/0136208 A1 | 6/2006 | Chung | |
| 2006/0167896 A1 | 7/2006 | Kapur | |
| 2006/0224565 A1 | 10/2006 | Ashutosh | |
| 2006/0248053 A1 | 11/2006 | Sanfilippo | |
| 2007/0021956 A1 | 1/2007 | Qu | |
| 2007/0073533 A1 | 3/2007 | Thione | |
| 2007/0136048 A1 | 6/2007 | Richardson-Bunbury | |
| 2007/0136251 A1 | 6/2007 | Colledge | |
| 2007/0168181 A1 | 7/2007 | Ejerhed | |
| 2007/0219986 A1 | 9/2007 | Egozi | |
| 2007/0233656 A1 | 10/2007 | Bunescu | |
| 2007/0239734 A1 | 10/2007 | Arellanes | |
| 2007/0244866 A1 | 10/2007 | Mishkanian | |
| 2007/0271340 A1* | 11/2007 | Goodman | G06Q 10/107 709/206 |
| 2008/0033714 A1* | 2/2008 | Gupta | 704/9 |
| 2008/0109454 A1 | 5/2008 | Willse | |
| 2008/0154582 A1 | 6/2008 | Bruecken | |
| 2009/0171937 A1* | 7/2009 | Chen et al. | 707/5 |
| 2009/0204386 A1* | 8/2009 | Seligman | G06F 17/2755 704/2 |
| 2012/0297277 A1* | 11/2012 | King et al. | 715/201 |

FOREIGN PATENT DOCUMENTS

| | | |
|---|---|---|
| KR | 1020060118253 | 11/2006 |
| WO | 2005010691 | 2/2005 |

OTHER PUBLICATIONS

"Open-domain Surface-Based Question Answering System" by Aaron Galea, Department of Computer Science and AI, University of Malta, pp. 58-63, Jul. 2003.

"Using WordNet to Disambiguate Word Senses for Text Retrieval" by Ellen M. Voorhees, pp. 171-180, 1993, ISBN: 0-89791-605-0.

Written Opinion and Search Report in Foreign Application No. 2008055048 filed Feb. 26, 2008.

Prosecution History for U.S. Appl. No. 11/710,805 including: Issue Notification dated Jan. 18, 2012, Notice of Allowance dated Oct. 26, 2011, Amendment with RCE dated Oct. 21, 2010, Final Office Action dated Jul. 28, 2010, Amendment dated May 14, 2010, Non-Final Office Action dated Dec. 17, 2009, Amendment with RCE dated Nov. 20, 2009, Advisory Action dated Oct. 13, 2009, Amendment After Final dated Sep. 24, 2009, Final Office Action dated Jul. 17, 2009, Amendment dated May 1, 2009, Part 1 of 2.

Prosecution History for U.S. Appl. No. 11/710,805 including: Non-Final Office Action dated Feb. 25, 2009 and Application and Drawings filed Feb. 26, 2007, pp. 248, Part 2 of 2.

* cited by examiner

AUTOMATIC DISAMBIGUATION BASED ON A REFERENCE RESOURCE

The present application is a continuation of and claims priority of U.S. patent application Ser. No. 11/710,805, filed Feb. 26, 2007, the content of which is hereby incorporated by reference in its entirety.

BACKGROUND

The ability to identify named entities, such as people and locations, within a document, has been established as an important task in areas such as topic detection and tracking, machine translation, and information retrieval. A user may perform a search of the Web or another resource for a particular person, place, or other specific entity, by entering a string of text characters that constitutes an orthographic representation of a common name for the entity, as a query in a search engine. However, this string of text may also refer to other, unrelated entities or meanings that are irrelevant to the intended search results, while many relevant references may use other variations on the orthographic representation of the entity, and thereby be missed by the search engine given the particular string of text. For example, a search based on the string of text "George W. Bush" might return results that instead reference the earlier American president, George H. W. Bush, or George Bush International Airport in Houston, the aircraft carrier George H. W. Bush, other famous people, places, or entities with "Bush" in their name, or to a literal "bush" or shrub as a category of plant. A search may also miss alternate "surface forms", or alternate orthographic references to the same intended entity, such as a reference with an abbreviated, alternate, casual, or other context-specific form of the name of the intended entity. For instance, alternate surface forms for George W. Bush that are used in various documents available on the Web may include "President Bush", "Bush 43", or even an orthographically unrelated term such as "Dubya". Other Web-available references might reference Ronald Reagan as "The Gipper" or Abraham Lincoln as "Honest Abe". Any of these documents might contain valuable information that would be desirable to include in search results for a search for the respective entities, but may be missed using a search for a string of text that represents the standard surface form for representing the respective entities. It would therefore be highly desirable to identify text references to particular named entities consistently with all the various surface forms in which such references may occur.

While the intended entity for an ambiguous surface form might be quite clear to many informed readers due to context in some instances, for example "Bush delivered his State of the Union address to Congress", many other instances may be more ambiguous, e.g., "Bush delivered the commencement address at the university". In the latter example, the surface form "Bush" may actually refer to former president George H. W. Bush or to former Florida governor Jeb Bush, for example, and readers unfamiliar with the event covered would not be able to resolve it correctly. In addition, with text content distributed around the world on the Internet, it is to be expected that many readers of any content might be from backgrounds that do not dispose them to understand the entire context that a writer would take for granted. An effective way to provide explicit disambiguation of ambiguous surface forms for specific entities would therefore fulfill a broad and persistent need.

The discussion above is merely provided for general background information and is not intended to be used as an aid in determining the scope of the claimed subject matter.

SUMMARY

A novel system for automatically indicating the specific identity of ambiguous named entity mentions is provided. An automatic disambiguation data collection may be created using a reference resource. Explicit named entities may be catalogued from the reference resource, together with various abbreviated, alternative, and casual ways of referring to the named entities. Entity indicators, such as labels and/or context indicators associated with the named entities in the reference resource, may also be catalogued. The automatic disambiguation collection may then be used as a basis for evaluating ambiguous references to named entities in text content provided in different applications. The content surrounding the ambiguous reference may be compared with the entity indicators to find a good match, indicating that the named entity associated with the matching entity indicators is the intended identity of the ambiguous reference, which may be automatically provided to a user. A computing device may therefore provide unambiguous indications of the particular named entity referred to by potentially ambiguous surface forms in various documents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
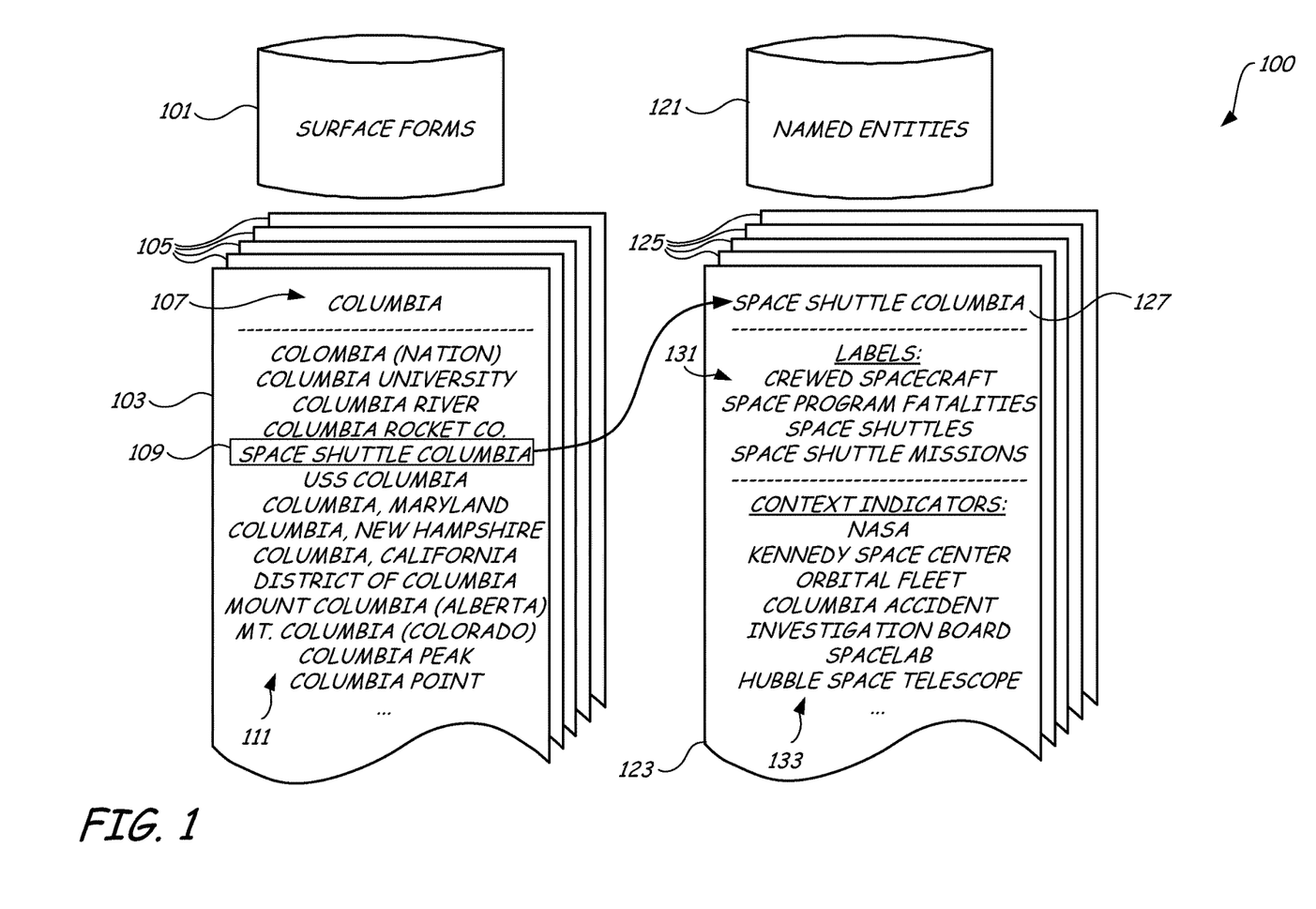
FIG. 1 depicts a block diagram for a software system for automatic disambiguation, according to an illustrative embodiment.

FIG. 1 depicts a block diagram for a software system 100 for automatic disambiguation, according to an illustrative embodiment. For example, software system 100 may include one or more databases and other software stored on a computer-readable medium. These may include, for example, a surface form reference database 101 with a collection of reference surface form records 103, 105; and a named entity reference database 121 with a collection of reference named entity records 123, 125, in this illustrative embodiment. The surface form reference database 101 contains different surface forms, which are defined as alternative words or multi-word terms that may be used to represent particular entities. Each of the reference surface form records 103, 105 is indexed with one or more named entities 111 associated with one or more of the reference named entity records 123, 125. Each of the reference named entity records 123, 125 is in turn associated with one or more entity indicators, which may include labels 131 and/or context indicators 133 in this embodiment. The labels 131 and context indicators 133 may be extracted from one or more reference works or other types of information resources, in which the labels 131 and context indicators 133 are associated with the named entity records 123, 125. Various embodiments may make use only of labels as entity indicators, or only of context indicators as entity indicators, or both. Various embodiments are also not limited to labels and context indicators as entity indicators, and may also use additional types of entity indicators, in any combination.

Software system 100 is enabled to disambiguate a polysemic surface form and associate an entity to it, from among different named entities, such as persons, places, institutions, specific objects or events, or are otherwise referred to with proper names. Named entities are often referred to with a variety of surface forms, which may for example be made up of abbreviated, alternative, and casual ways of referring to the named entities. One surface form may also refer to very different entities. For example, different instances of the surface form "Java" may be annotated with different entity disambiguations, to refer to "Java (island)", "Java (programming language)", "Java (coffee)", etc., in one exemplary embodiment. A user interested in gaining information about the island of Java will therefore be able to reliably and easily home in on only those references that actually refer to the island of Java, in this example. Any document may be interpreted as a collection of references to particular named entities, so that the named entities can be dealt with directly for navigating and using the information contained in the documents. For example, a user selection of a surface form may lead to a Web search, a news search, or a search of an indexed collection of documents, for the entity indicated by the surface form, in different embodiments.

For example, in the illustrative embodiment of FIG. 1, reference surface form record 103 is for the surface form "Columbia", as indicated at the record's title 107. The surface form "Columbia" is associated in reference surface form record 103 with a variety of named entities that might be referred to by the surface form "Columbia", an illustrative sample of which are depicted in FIG. 1. These include "Colombia (nation)", which has a minor difference in spelling but often an identical pronunciation to surface form 107; Columbia University; the Columbia River; a hypothetical company called the Columbia Rocket Company; the Space Shuttle Columbia; the USS Columbia; and a variety of other named entities. The variation in spelling between "Columbia" and "Colombia" is another example of different surface forms that may represent the same named entity; for example, a Web search for "Bogota Columbia" returns a large fraction, about one third, as many search results as a Web search for "Bogota Colombia".

Reference named entity record 123 illustrates one example of a reference named entity in named entity reference database 121 that may be pointed to by one of the named entities 111 associated with reference surface form record 103. Reference named entity record 123 is for the named entity 127, "Space Shuttle Columbia", and is associated with a variety of entity indicators. The entity indicators include labels 131 and context indicators 133, in this illustrative embodiment. The labels 131 illustratively include "crewed spacecraft", "space program fatalities", "space shuttles", and "space shuttle missions", while the context indicators 133 illustratively include "NASA", "Kennedy Space Center", "orbital fleet", "Columbia Accident Investigation Board", "Spacelab", and "Hubble Service Mission", in the embodiment of FIG. 1. The labels 131 and context indicators 133 are used as bases for comparison with a text in which an ambiguous surface form appears, to evaluate what named entity is intended by the surface form, and are explained in additional detail below. The particular labels 131 and context indicators 133 depicted in FIG. 1 are provided only as illustrative examples, while any other appropriate entity indicators might be associated with the reference named entity "Space Shuttle Columbia", and any of a variety of other named entities may be associated with the surface form "Columbia". Additionally, other reference surface forms may also be used, with their associated named entities, and with the appropriate entity indicators associated with those reference named entities.

Figure 2:
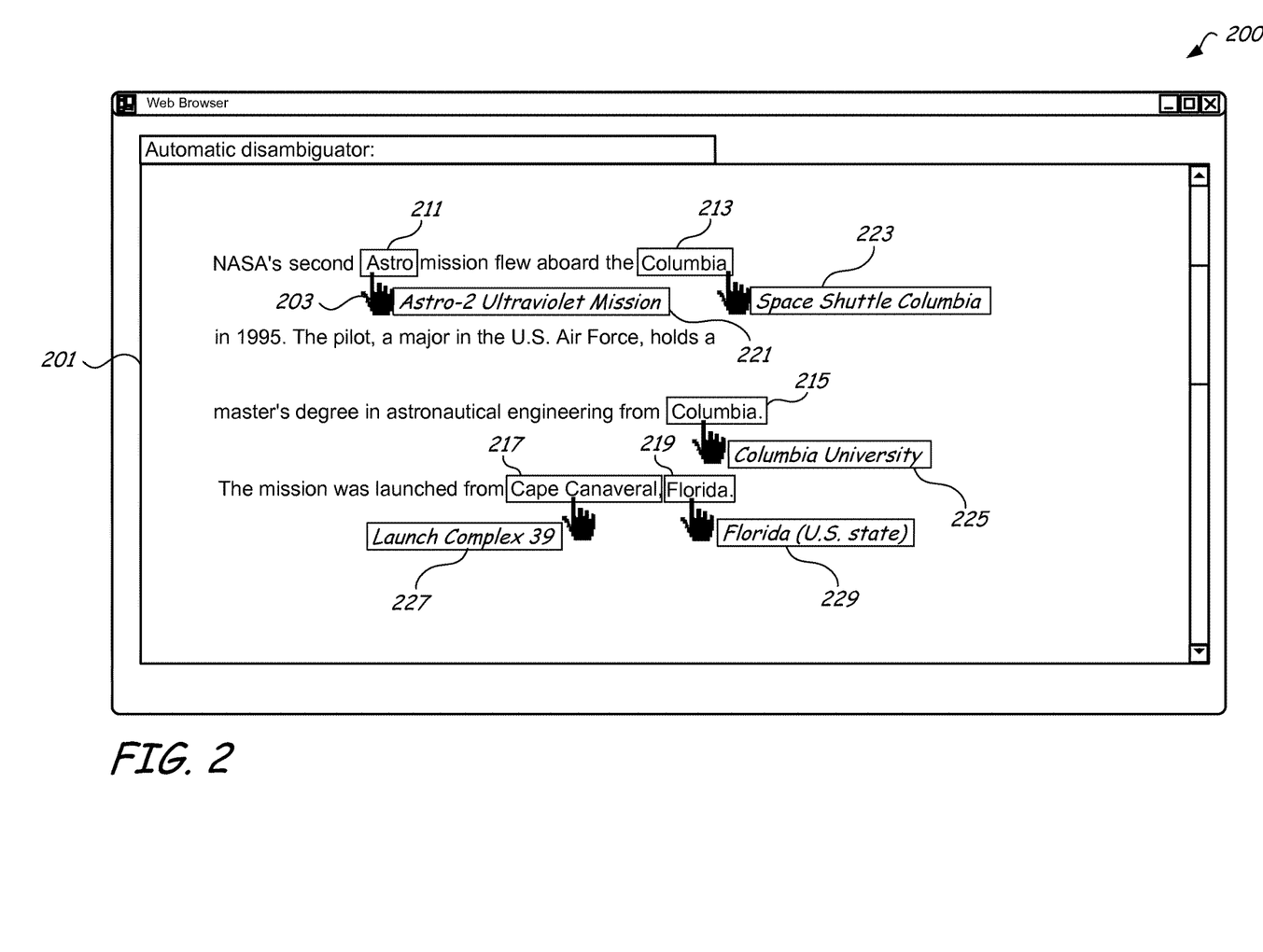
FIG. 2 depicts a screenshot of an application displaying text content, with disambiguation outputs provided by an automatic disambiguation application, according to an illustrative embodiment.

FIG. 2 depicts a screenshot 200 of a text-associated application that has provided a text panel 201, according to one illustrative embodiment. Text panel 201 provides an example of a text in which several surface forms may appear, and for which the software system 100 of FIG. 1 may provide automatic disambiguation and mapping to the reference entities. The application that provides text panel 201 may, for example, be a web browser with a website loaded, a reference work application, or an email application, for example.

In one illustrative embodiment, a user may use a pointer 203 to indicate or select a surface form, such as by manipulating a mouse or trackball to move pointer 203 in position over a surface form, such as by clicking on the surface form, or merely by hovering the pointer 203 over the surface form, in different embodiments. FIG. 2 illustrates the pointer 203 being used in several different positions in a text, to select surface forms 211, 213, 215, 217, and 219, for which a disambiguation system respectively provides disambiguation outputs 221, 223, 225, 227, and 229. As particular illustrative examples, surface form 211 for "Astro" is disambiguated to mean the named entity 221, the "Astro-2 Ultraviolet Mission"; surface form 213 for "Columbia" is disambiguated to mean the named entity 223, the "Space Shuttle Columbia"; surface form 215 for "Columbia" is disambiguated to mean the named entity 225, "Columbia University" (the differing disambiguations of the same surface form is elaborated on further below); surface form 217 for "Cape Canaveral" is disambiguated to mean the named entity 227, "Launch Complex 39" near Cape Canaveral; and surface form 219 for "Florida" is disambiguated to mean the named entity 229, for "Florida (U.S. state)", as opposed, for example, to a reference to the University of Florida. These illustrative disambiguation outputs are provided by a disambiguation system, illustratively such as software system 100 of FIG. 1, and displayed near the pointer 203 for each of the selected surface forms.

For example, when surface form 213, "Columbia", is selected, the disambiguation system provides a disambiguation output 223, which reads "Space Shuttle Columbia", referring to the specific surface form and named entity illustratively depicted in the reference surface form record 103 and the reference named entity record 123 in FIG. 1. This and the other particular surface forms and named entities depicted in FIG. 2 are illustrative only, and any other reference to a named entity in any kind of text, including a language input in another form of media that is converted into text, may be acted on by a disambiguation system to provide disambiguation outputs for polysemic surface forms and explicit annotations identifying the entities intended to be referenced by various surface forms.

Figure 3:
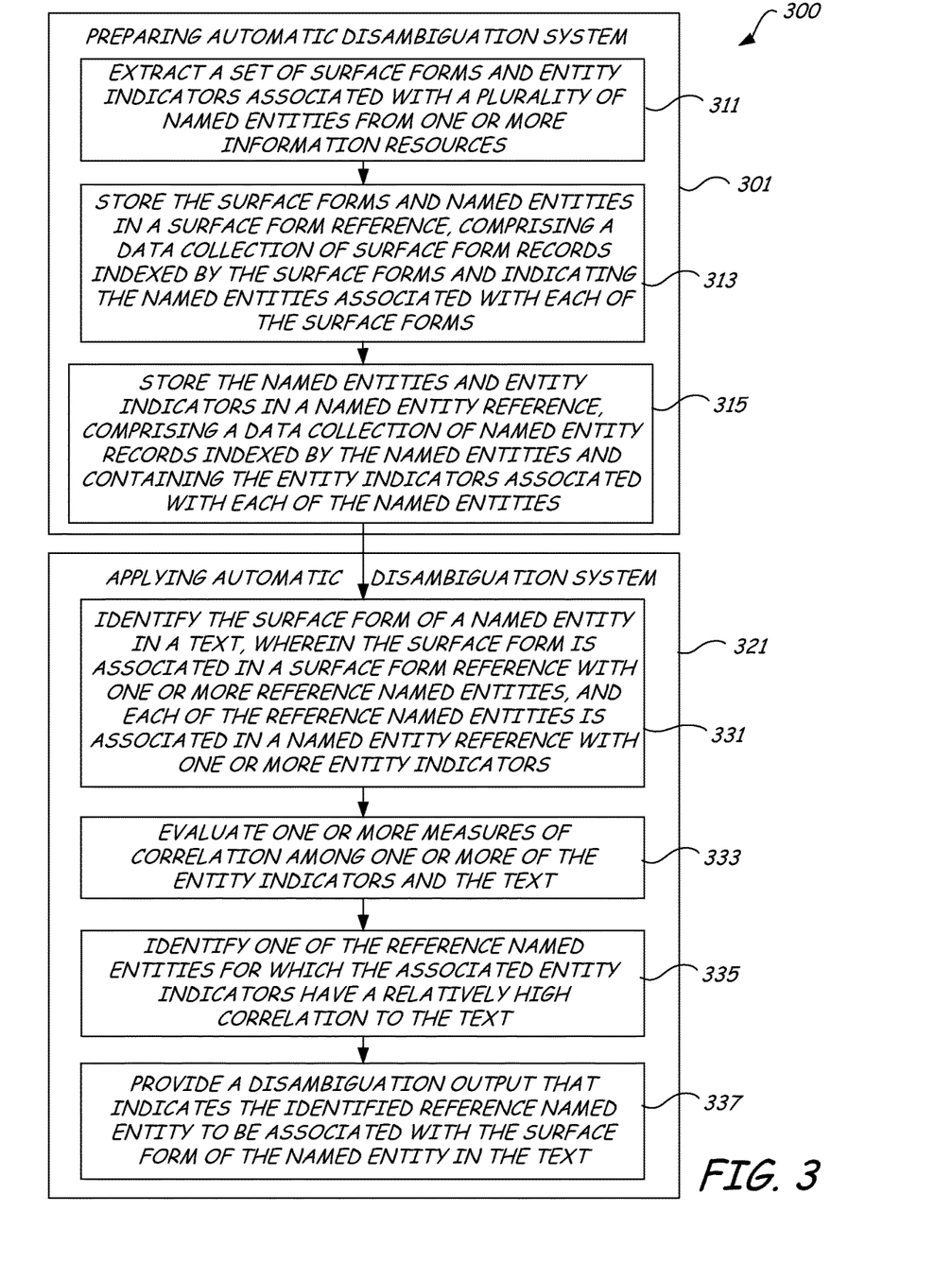
FIG. 3 depicts a flow diagram for a method for preparing and applying an automatic disambiguation system, according to an illustrative embodiment.

How the disambiguation system works, to provide the disambiguation outputs 221, 223, 225, 227, and 229 respectively for the selected surface forms 211, 213, 215, 217, and 219, according to one illustrative embodiment, is depicted in reference to an illustrative method 300 in FIG. 3.

FIG. 3 depicts method 300 for providing a disambiguation output for an ambiguous surface form, in one illustrative example. Method 300 includes two high-level portions, in this embodiment: procedure 301, for preparing an automatic disambiguation system, and procedure 321, for applying the automatic disambiguation system. Procedure 301 may illustratively include assembling the reference surface forms, associated reference named entities, and associated entity indicators of software system 100 in FIG. 1, for example, while procedure 321 may illustratively include using software system 100 in the process of providing disambiguation outputs in response to a user selecting ambiguous reference forms in text panel 201 of FIG. 2, for example.

According to the illustrative embodiment of FIG. 3, procedure 301 illustratively includes step 311, of extracting a set of surface forms and entity indicators associated with a plurality of named entities from one or more information resources. Procedure 301 may further include step 313, of storing the surface forms and named entities in a surface form reference, comprising a data collection of surface form records indexed by the surface forms and indicating the named entities associated with each of the surface forms. Procedure 301 may also include step 315, of storing the named entities and entity indicators in a named entity reference, comprising a data collection of named entity records indexed by the named entities and containing the entity indicators associated with each of the named entities.

Procedure 321 includes step 331, of identifying a surface form of a named entity in a text, wherein the surface form is associated in a surface form reference with one or more reference named entities, and each of the reference named entities is associated in a named entity reference with one or more entity indicators.

Procedure 321 further includes step 333, of evaluating one or more measures of correlation among one or more of the entity indicators, and the text; step 335, of identifying one of the reference named entities for which the associated entity indicators have a relatively high correlation to the text, where a correlation may be relatively high if it is higher than a correlation with at least one alternative, for example; and step 337, of providing a disambiguation output that indicates the identified reference named entity to be associated with the surface form of the named entity in the text. Step 333 may include using labels alone, context indicators alone, both labels and context indicators, other entity indicators, or any combination of the above, as the entity indicators used for evaluating correlation. The disambiguation process therefore uses the data associated with the known surface forms identified in the information resource, and any of a wide variety of possible entity disambiguations in the information resource, to promote the capacity for automatic indications of high correlation between information from a text that mentions a surface form of a named entity, and the labels and context indicators stored in a named entity reference for that named entity, so that the reference to it in the document can be easily, automatically, reliably disambiguated.

Different embodiments may use different particular steps for any part of procedure 301, and are not limited to the particular examples provided in connection with FIG. 3. The illustrative steps depicted in FIG. 3 are elaborated on below.

Referring again to step 311, the information resources used for extracting the reference surface forms and entity indicators associated with named entities, may include a variety of reference sources, such as an electronic encyclopedia, a web publication, a website or related group of websites, a directory, an atlas, or a citation index, for example. Different embodiments may use any combination of these information resources, and are not limited to these examples, but may also include any other type of information resource.

For example, in one illustrative embodiment, an electronic encyclopedia may be used as an information resource from which to extract the information referred to in method 300. The electronic encyclopedia may be distributed and accessed on a local storage device, such as a DVD, a set of CDs, a hard drive, a flash memory chip, or any other type of memory device, or it may be distributed and accessed over a network connection, such as over the Internet, or a wide area network, for example. In another embodiment, the information resource may include a website, such as that of a large news organization, library, university, government department, academic society, or research database. In another embodiment, the information resource may include a large research citation website or a website for uploading drafts of research papers, for example. In other embodiments, the information resource may include a selected set of websites, such as a group of science-oriented government websites that includes the content of the websites for NASA, the NOAA, the Department of Energy, the Centers for Disease Control and Prevention, and the National Institutes of Health, for example. Other embodiments are not limited to these illustrative examples, but may include any other type of information resource from which the appropriate information may be extracted.

In one illustrative embodiment, an electronic encyclopedia may include various encyclopedia entries, articles, or other documents about a variety of different named entities that include "Colombia", "Columbia University", "Columbia River", "Space Shuttle Columbia", and so forth. The names for these named entities may serve as the titles for the articles in the encyclopedia. As procedure 301 of preparing the automatic disambiguation system is being performed, the information is extracted from the article entitled "Colombia (nation)", including an indication that it is sometimes referred to under the spelling "Columbia". A reference named entity record entitled "Colombia" is created in the named entity reference database 121, and the reference named entity "Colombia (nation)", associated with the reference named entity, is added to a reference surface form record for the surface form "Columbia" in a surface form reference database 101. Similarly, information is extracted from a document about "Columbia University" in the electronic encyclopedia to create a reference named entity record for "Columbia University", with the reference named entity added to the record for reference surface form "Columbia", information is extracted from an entry in the electronic encyclopedia entitled "Space Shuttle Columbia" to add the corresponding reference named entity record in the named entity reference database and an associated addition to the record for reference surface form "Columbia", and so forth. The different steps 311 and 313 may be repeated iteratively for each document or other information resource from which information such as surface forms and entity indicators are extracted, or information from several documents may be extracted and then stored together, for example; the different aspects of procedure 301 may be performed in any order.

Each of the named entities extracted from an information resource may be stored with associations to several surface forms. For example, the title of an article or other document may be extracted as a surface form for the named entity to which it is directed. A named entity may often be referred to by a surface form that unambiguously identifies it, and may have a document in the information resource that is entitled with that unambiguous name. The title of an encyclopedia article may also have a distinguishing characteristic added to the title, to keep the nature of the document free from ambiguity. For example, an article in an electronic encyclopedia on the U.S. state of Georgia may be entitled "Georgia (U.S. state)", while another article may be entitled "Georgia (country)". Both of these may be extracted as named entities, with both of them associated with the surface form "Georgia".

Information for the entity indicators may be collected at the same time as for surface forms. In this case, for example, the other information in these document titles could be stored among the labels 131 for the respective reference named entity records, so that the reference named entity record on "Georgia (U.S. state)" includes the label "U.S. state" and the reference named entity record on "Georgia (country)" includes the label "country". The labels may constitute classifying identifiers applied to the respective named entities in the encyclopedia or other information source.

An electronic encyclopedia may also include documents such as a redirect entry or a disambiguation entry. For example, it may have a redirect entry for "NYC" so that if a user enters the term "New York City" in a lookup field, the "NYC" redirect page automatically redirects the user to an article on New York City. This information could therefore be extracted to provide a reference named entity record for New York City with an associated surface form of "NYC". Similarly, the surface form "Washington" and an associated context indicator of "D.C." can be extracted from a document entitled "Washington, D.C." Context indicators are discussed further below.

Another feature an electronic encyclopedia may use is a disambiguation page. For example, the encyclopedia may have a disambiguation page for the term "Washington" that appears if someone enters just the term "Washington" in a lookup field. The disambiguation page may provide a list of different options that the ambiguous term may refer to, with links to the specific documents about each of the specific named entities, which may include "Washington, D.C.", "Washington (U.S. state)", "George Washington", and so forth. Information could therefore be extracted from this disambiguation page of the information resource for reference named entity records for each of the specific named entities listed, with a surface form of "Washington" recorded for each of them, and with context indicators extracted for each of the named entities based on the elaboration to the term "Washington" used to distinguish the different documents linked to on the disambiguation page.

Various other sources may also be used for extracting label and context information for the reference named entity records. For example, different entries in the electronic encyclopedia may include category indicator tags, and the encyclopedia may include a separate page for a category, showing all the entries that are included in that category. For example, the entries for "Florida" and "Georgia (U.S. state)" may both include category tags labeled "Category: U.S. States". The encyclopedia may also include separate pages for lists, such as a page entitled, "List of the states in the United States of America", with each entry on the list linked to the individual encyclopedia entry for that state.

Labels are not limited to the particular examples discussed above, such as title information, categories and other types of tags, and list headings, but may also include section names or sub-headings within another article, or a variety of other analogous labeling information.

Context indicators are other types of entity indicators that may be extracted from an electronic encyclopedia or other information resource and applied to respective named entities, either alone or together with labels, among other combinations, in different embodiments. Context indicators may include attributes such as elements of text associated with their respective named entities, by means of an association such as proximity in the title of an article in an encyclopedia or other type of information resource, proximity to the name of the named entity in the text of an entry or article, or inclusion in a link to or from another entry directed to another named entity in the information resource, for example. As examples of linking context indicators, an article about the Space Shuttle Columbia may include a reference to its serving mission to the Hubble Space Telescope, with the phrase "Hubble Space Telescope" linked to an article on the same; while another article on the Kennedy Space Center may include a reference to the "Space Shuttle Columbia" with a link to that article. The titles of articles linking both to and from the article on the space shuttle Columbia may be extracted as context indicators in the named entity reference record for "Space Shuttle Columbia". Other types of context indicators may also be used, that are not limited to these illustrative examples.

Context indicators and labels may both provide valuable indicators of what particular named entity is intended with a given surface form. For example, the electronic encyclopedia may include an article that contains both the surface forms "Discovery" and "Columbia". Their inclusion in the same article, or their proximity to each other within the article, may be taken as a context indicator of related content, so that each term is recorded as a context indicator associated with the named entity reference of the other term, under the specific named entity reference records for "Space Shuttle Discovery" and "Space Shuttle Columbia" in the named entity reference database. Additionally, both terms may appear in an article entitled "Space shuttles", and they both may link to several other articles that have a high rate of linking with each other, and with links to and from the article entitled "Space shuttles". These different aspects may be translated into context indicators recorded in the named entity references, such as a context indicator for the term "space shuttle" in both of the named entity reference records. It may also be used to weight the context indicators, such as by giving greater weight to context indicators with a relatively higher number of other articles that also have links in common with both the named entity and the entity indicator.

Weighting the relevance of different entity indicators may also take the form of weighting some entity indicators at zero. This may be the case if a very large amount of potential entity indicators are available, and certain criteria are used to screen out identity indicators that are predicted to be less relevant. For example, context indicators may be extracted and recorded to a named entity reference record only if they are involved in an article linked from the article for the named entity that also links back to the article for the named entity, or if the article for a candidate context indicator shares a threshold number of additional articles to which it and the article for the named entity share mutual links. Techniques such as these can effectively filter candidate context indicators to keep unhelpful indicators out of the named entity reference record.

Additionally, both the "Space Shuttle Discovery" and "Space Shuttle Columbia" articles in the electronic encyclopedia may include category tags for "Category: Crewed Spacecraft" and "Category: Space Shuttles". They may both also include a list tag for "List of Astronautical Topics". These category and list tags and other potential tags may be extracted as labels for the named entity references for both named entities. The quantity of different labels and context indicators in common between the two named entity references could contribute to a measure of correlation or similarity between the two named entity references.

Returning to procedure 321, with the automatic disambiguation system prepared by procedure 301, it is ready to use to disambiguate named entities in a subject text. This subject text may be from a web browser, a fixed-layout document application, an email application, a word processing application, or any other application that deals with the presentation of text output.

Procedure 321 may also include some pre-processing steps to facilitate identifying the surface forms of named entities. For example, the system may split a document into sentences and truecase the beginning of each sentence, hypothesizing whether the first word is part of an entity or it is capitalized because of orthographic conventions. It may also identify titles and hypothesize the correct case for words in the titles.

In a second stage of pre-processing the text, a statistical named-entity recognizer may identify boundaries of mentions of the named entities in the text, and assign each set of mentions sharing the same surface form a probability distribution over named entity labels, such as Person, Location, Organization, and Miscellaneous.

In this illustrative embodiment, the named entity recognition component may also resolve structural ambiguity with regard to conjunctions (e.g., "The Ways and Means Committee", "Lewis and Clark"), possessives (e.g., "Alice's Adventures in Wonderland", "Britain's Tony Blair"), and prepositional attachment (e.g., "Whitney Museum of American Art", "Whitney Museum in New York") by using surface form information extracted from the information resource, when available, with back-off to co-occurrence counts on the Web. The back-off method can be applied recursively, as follows: for each ambiguous term $T_0$ of the form $T_1$ Particle $T_2$, where Particle is one of a possessive pronoun, a coordinative conjunction, or a preposition, optionally followed by a determiner, and the terms $T_1$ and $T_2$ are sequences of capitalized words and particles, a web search can be performed on the search query ""$T_1$" "$T_2$"", which yields only search results in which the whole terms $T_1$ and $T_2$ appear. A collection of the top search results, for example the first 200, may be evaluated to see how many also include the term $T_0$, as a test of whether $T_0$ is a reference to one single entity, or if $T_1$ and $T_2$ are two separate entities conjoined in context.

In a third stage of pre-processing the text, shorter or abbreviated surface forms may be resolved to longer forms. It is not uncommon for a named entity to be introduced in a document in a longer, formal version of the name of the entity, and for at least some subsequent mentions of the entity to be made with abbreviated or more casual surface forms. For example, a text may introduce a reference to the named entity "Franklin Delano Roosevelt", and then make several subsequent references to the more abbreviated or casual surface forms, "Franklin Roosevelt", "President Roosevelt", "Roosevelt", or simply "FDR", though some subsequent references to the full name of the named entity may also be made. A regular pattern consistent with this usage in the threshold search results may be taken to indicate that a set of a longer named entity with component forms of the named entity is indeed a regular relationship between a named entity and surface forms of the named entity in the text. Therefore, before attempting to solve semantic ambiguity with subsequent steps of procedure 321, the system may hypothesize in-document co-references and map short surface forms to longer surface forms with the same dominant label. For example, "Roosevelt"/PERSON can be mapped to "Franklin Delano Roosevelt"/PERSON.

This is only one illustrative example of pre-processing named references and surface forms in a document. Additional pre-processing steps, such as for resolving acronyms may also be resolved in a similar manner when possible. The system is not limited to any particular pre-processing steps or to performing any pre-processing steps, in other embodiments.

Such pre-processing stages may be followed by extracting the contextual and category information from the information resource to disambiguate the entities in the subject text, following the steps of procedure 321. Procedure 321 may produce the disambiguation output in any of a variety of forms. For example, it may create hyperlinks in the subject text, from the named entities and surface forms of the named entities, to articles in the information resource directed to the named entities. Or, in another embodiment, the system may provide a pop-up disambiguation output box adjacent to a pointer when the user hovers a pointer over a surface form, as depicted in FIG. 2. Other embodiments are not limited to these illustrative examples, but may provide any form of disambiguation output.

In one illustrative embodiment, the disambiguation process may employ a vector space model, in which a vectorial representation of the processed document is compared with vectorial representations of the named entity references stored in the named entity database. Once the surface forms in a subject text are identified and the in-document co-references hypothesized, the system may retrieve all possible entity disambiguations of each surface form. Their entity indicators, such as the labels and context indicators that occur in the document, may be aggregated into a document vector, which is subsequently compared with named entity vectors representing the named entity references of various possible entity disambiguations, so that one or more measures of correlation between the vectors representing surface forms in the text and the vectors representing the entity indicators may be evaluated. One of the reference named entities may then be identified for a particular surface form, that maximizes the similarity between the document vector and the entity vectors. Or, in other embodiments, a reference named entity is identified that in some other way is found to have a high correlation to the surface form in the text, relative to other candidate named entities.

The illustrative example of maximizing the similarity of the vectors representing the surface form from the subject text, and the identified reference named entity, may be elaborated on as follows, in accordance with one illustrative embodiment. It may be well appreciated by those skilled in the art that a broad variety of other implementations may be analogous to or approximate to the illustrative implementation described here, within the scope of various embodiments; and furthermore that other embodiments may also be implemented with very substantial differences, that nevertheless accomplish the broad outlines of aspects of the present disclosure.

In this illustrative example, a vector space model may be used to evaluate measures of correlation or similarity between elements of a subject text and entity indicators. In this illustrative embodiment, formally, let $C=\{c_1, \ldots, c_m\}$ be the set of known context indicators from the information resource, and $T=\{t_1, \ldots, t_N\}$ be the set of known labels. An entity e can then be represented as a vector $\delta_e \in \{0,1\}^{M+N}$ with two components, $\delta_e|_C \in \{0,1\}^M$ and $\delta_e|_T \in \{0,1\}^N$, corresponding to the context information and category labels, respectively:

$$\delta_e^i = \begin{cases} 1, & \text{if } c_i \text{ is a context indicator for entity } e \\ 0, & \text{otherwise} \end{cases}$$

$$\delta_e^{M+j} = \begin{cases} 1, & \text{if } t_j \text{ is a label for entity } e \\ 0, & \text{otherwise} \end{cases}$$

Let $\epsilon(s)$ denote the set of entities that are known to have a surface form For example, in FIGS. 1 and 2, the named entities "Columbia University" and "Space Shuttle Columbia" are two named entities that both share a common surface form, in "Columbia". Let D be a document to be analyzed and let $S(D)=\{s_1, \ldots, s_n\}$ be the set of surface forms identified in D. A context vector may be built as $d=\{d_1, \ldots, d_m\} \in N^M$, where $d_i$ is the number of occurrences of context indicators $c_i$ in D. To account for all possible disambiguations of the surface forms in D, an extended vector may also be built as $\bar{d} \in N^{M+N}$ so that $\bar{d}|_C = d$ and $$\bar{d}|_T = \sum_{s \in S(D)} \sum_{e \in \epsilon(s)} \delta_e \bigg|_T.$$

The goal in this illustrative embodiment is to find the assignment of entities to surface forms $s_i \rightarrow e_i$, $i \in 1 \ldots n$, that maximizes the agreement between $\delta_{e_i}|_C = d$ and d, as well as the agreement between the labels of any two entities $\delta_{e_i}|_T$ and $\delta_{e_j}|_T$. For example, the document may contain both the surface forms "Discovery" and "Columbia". On one hand, the disambiguations "Space Shuttle Discovery" and "Space Shuttle Columbia" would share a large number of category labels and thus, this assignment would result in a high agreement of their category components. On the other hand, the category components for the disambiguations "Space Shuttle Discovery" an "Colombia (country)" would not be likely to generate a significant measure of correlation/agreement between each other. This agreement maximization process is discussed in more detail further below. In another illustrative example, agreement between different context indicators may be evaluated to maximize the agreement or correlation with entity indicators in the text. One document that mentions "Columbia" may also include the text strings "NASA", "Kennedy Space Center", and "solid rocket booster", leading to identification of the surface form "Columbia" with the named entity "Space Shuttle Columbia". Another document that mentions "Columbia" may also include the text strings "Bogota", "Cartagena", and "Alvaro Uribe", leading to identification of the surface form "Columbia" with the named entity "Colombia (nation)".

The agreement maximization process can be written as the following Equation 1:

$$\operatorname*{argmax}_{(e_1, \ldots, e_n) \in \epsilon(s_1) \times \ldots \times \epsilon(s_n)} \sum_{i=1}^{n} \langle \delta_{e_i}|_C, d \rangle + \sum_{i=1}^{n} \sum_{\substack{j=1 \\ j \neq i}}^{n} \langle \delta_{e_i}|_T, \delta_{e_j}|_T \rangle, \quad \text{(Eq. 1)}$$

where $\langle \cdot, \cdot \rangle$ denotes the scalar product of vectors.

One potential issue with Equation 1 is that an erroneous assignment of an entity to a surface form may interfere with the second term of Equation 1. This issue may be addressed with another strategy to account for category agreement, which reduces the impact of erroneous assignments in a computationally efficient manner, includes attempting to maximize agreement between the categories of the entity disambiguation of each surface form and the possible disambiguations of the other surface forms in the subject document or text. In one illustrative implementation, this may be equivalent to performing the following Equation 2:

$$\operatorname*{argmax}_{(e_1, \ldots, e_n) \in \epsilon(s_1) \times \ldots \times \epsilon(s_n)} \sum_{i=1}^{n} \langle \delta_{e_i}, \bar{d} - \delta_{e_i}|_T \rangle \quad \text{(Eq. 2)}$$

Using the definition of $\bar{d}$ and partitioning the context and category components, the sum in Equation 2 can be rewritten as $$\sum_{i=1}^{n} \langle \delta_{e_i}|_C, d \rangle + \sum_{i=1}^{n} \left\langle \delta_{e_i}|_T, \bar{d}\bigg|_T - \delta_{e_i}\bigg|_T \right\rangle =$$

$$\sum_{i=1}^{n} \langle \delta_{e_i}|_C, d \rangle + \sum_{i=1}^{n} \left\langle \delta_{e_i}|_T, \left(\sum_{i=1}^{n} \sum_{e \in \epsilon(s_j)} \delta_e\right) - \delta_{e_i}\bigg|_T \right\rangle =$$

$$\sum_{i=1}^{n} \langle \delta_{e_i}|_C, d \rangle + \sum_{i=1}^{n} \sum_{\substack{j=1 \\ j \neq i}}^{n} \left\langle \delta_{e_i}|_T, \sum_{e \in \epsilon(s_j)} \delta_e \right\rangle (q.e.d.)$$

In this implementation, the maximization of the sum in Equation 2 is equivalent to the maximization of each of its terms, which means that the computation reduces to $$\operatorname*{argmax}_{e_i \in \epsilon(s_i)} \langle \delta_{e_i}, \bar{d} - \delta_{e_i}|_T \rangle, \, i \in 1, \ldots, n,$$

or equivalently, $$\operatorname*{argmax}_{e_i \in \epsilon(s_i)} \langle \delta_{e_i}, \bar{d} \rangle - \|\delta_{e_i}|_T\|^2, \, i \in 1, \ldots, n \quad \text{(Eq. 3)}$$

The disambiguation process following this illustrative embodiment therefore may include two steps: first, it builds the extended document vector, and second, it maximizes the scalar products in Equation 3. In various embodiments, it is not necessary to build the document vector over all context indicators C, but only over the context indicators of the possible entity disambiguations of the surface forms in the document.

One illustrative embodiment may include normalizing the scalar products by the norms of the vectors, and thereby computing the cosine distance similarity. In another illustrative embodiment, following Equation 3, the scalar products are not normalized by the norms of the vectors, but rather, an implicit accounting is made for the frequency with which a surface form is used to mention various entities and for the importance of these entities, as indicated by entities that have longer articles in the information resource, that are mentioned more frequently in other articles, and that tend to have more category tags and other labels, according to an illustrative embodiment. A broad variety of other methods of evaluating the measures of similarity may be used in different embodiments, illustratively including Jensen-Shannon divergence, Kullback-Liebler divergence, mutual information, and a variety of other methods in other embodiments.

In some illustrative instances, one surface form can be used to mention two or more different entities within the same text or document. To account for such cases, the described disambiguation process may be performed iteratively in this embodiment for the surface forms that have two or more disambiguations with high similarity scores with the extended document vector. This may be done by iteratively shrinking the context used for the disambiguation of each instance of such a surface form from document level to paragraph level, and if necessary, to sentence level, for example. For example, in FIG. 2, the surface form "Columbia" appears twice, fairly close together, but intended to indicate two different named entities. The disambiguation data may be restricted to the sentence level in the immediate proximity of these two surface forms, or may concentrate the weightings assigned to entity indicators within the immediate sentence of the surface forms, in different embodiments. In one illustrative implementation, this would accord an overwhelming weight to entity indicators such as "NASA" for the first surface form of "Columbia", while assigning overwhelming weight to entity indicators such as "master's degree" for the second surface form of "Columbia", thereby enabling them to be successfully disambiguated into identifications with the named entities of the "Space Shuttle Columbia" and "Columbia University", respectively, according to this illustrative embodiment.

In another illustrative implementation, a user may be able to indicate a subset of text to be evaluated for disambiguation of surface forms, where the subset may be selected from among a group of optional units of text such as a document, a page, a paragraph, a sentence, or a manually selected portion of text.

In yet another illustrative example, a number of different candidate surface forms that overlap each other may be identified in the same text, and the different candidate surface forms may be separately evaluated to identify one of the overlapping surface forms that is associated with one of the reference named entities in the surface form reference, for which the associated entity indicators have a relatively high correlation to the text. A disambiguation output may then be provided that indicates the identified surface form and the reference named entity associated with the identified surface form, in this illustrative implementation.

Various embodiments of software and methods for automatic disambiguation may be embodied as modules within applications, or as separate applications that act on other text-associated applications, or may take other forms relative to the document or other form of text on which they operate. An automatic disambiguation module or application may act upon text in any of a broad range of applications, which may illustratively include, but are not limited to: a word processing application, a presentation application, a spreadsheet application, a database application, an email application, an instant messaging application, an information manager application, a web page application, a web page editing application, a reference work application, a fixed-layout document application, a desktop publishing application, a diagramming application, a project management application, a form developer application, a customer relationship management application, an enterprise resource planning application, a field services application, a retail management application, a social networking application, a tax preparation application, a finance management application, an accounting application, and a game application, for example.

Figure 4:
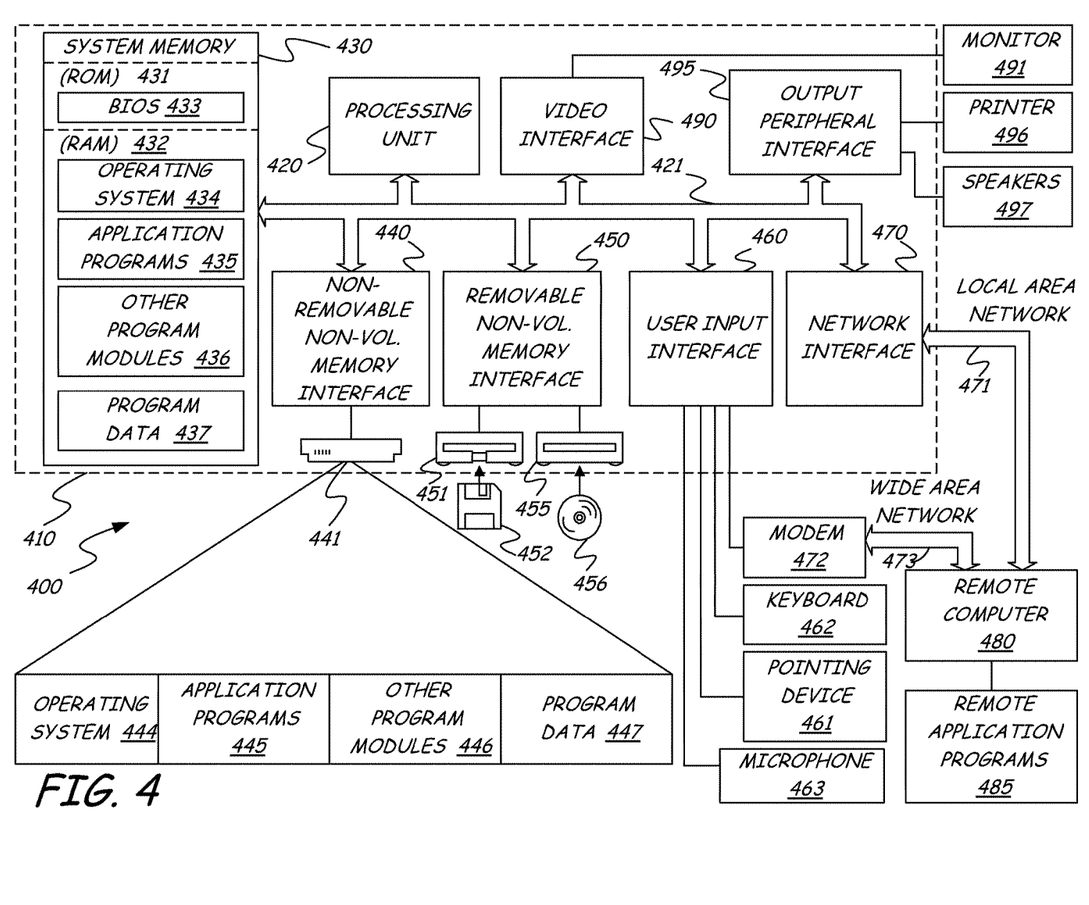
FIG. 4 depicts a block diagram of a computing environment in which some embodiments may be practiced, according to an illustrative embodiment.

FIG. 4 illustrates an example of a suitable computing system environment 400 on which various embodiments may be implemented. For example, various embodiments may be implemented as software applications, modules, or other forms of instructions that are executable by computing system environment 400 and that configure computing system environment 400 to perform various tasks or methods involved in different embodiments. A software application or module associated with an illustrative implementation of a speech recognition system using hidden trajectory modeling with differential cepstra may be developed in any of a variety of programming or scripting languages or environments. For example, it may be written in C#, F#, C++, C, Pascal, Visual Basic, Java, JavaScript, Delphi, Eiffel, Nemerle, Pert, PHP, Python, Ruby, Visual FoxPro, Lua, or any other programming language. It is also envisioned that new programming languages and other forms of creating executable instructions will continue to be developed, in which further embodiments may readily be developed.

Computing system environment 400 as depicted in FIG. 4 is only one example of a suitable computing environment for implementing various embodiments, and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 4, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable volatile/nonvolatile computer storage media. By way of example and not limitation, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may be operated in a networked environment using logical connections to one or more remote computers, such as a remote computer 480. The remote computer 480 may be a personal computer, a handheld device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 may include a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

Figure 5:
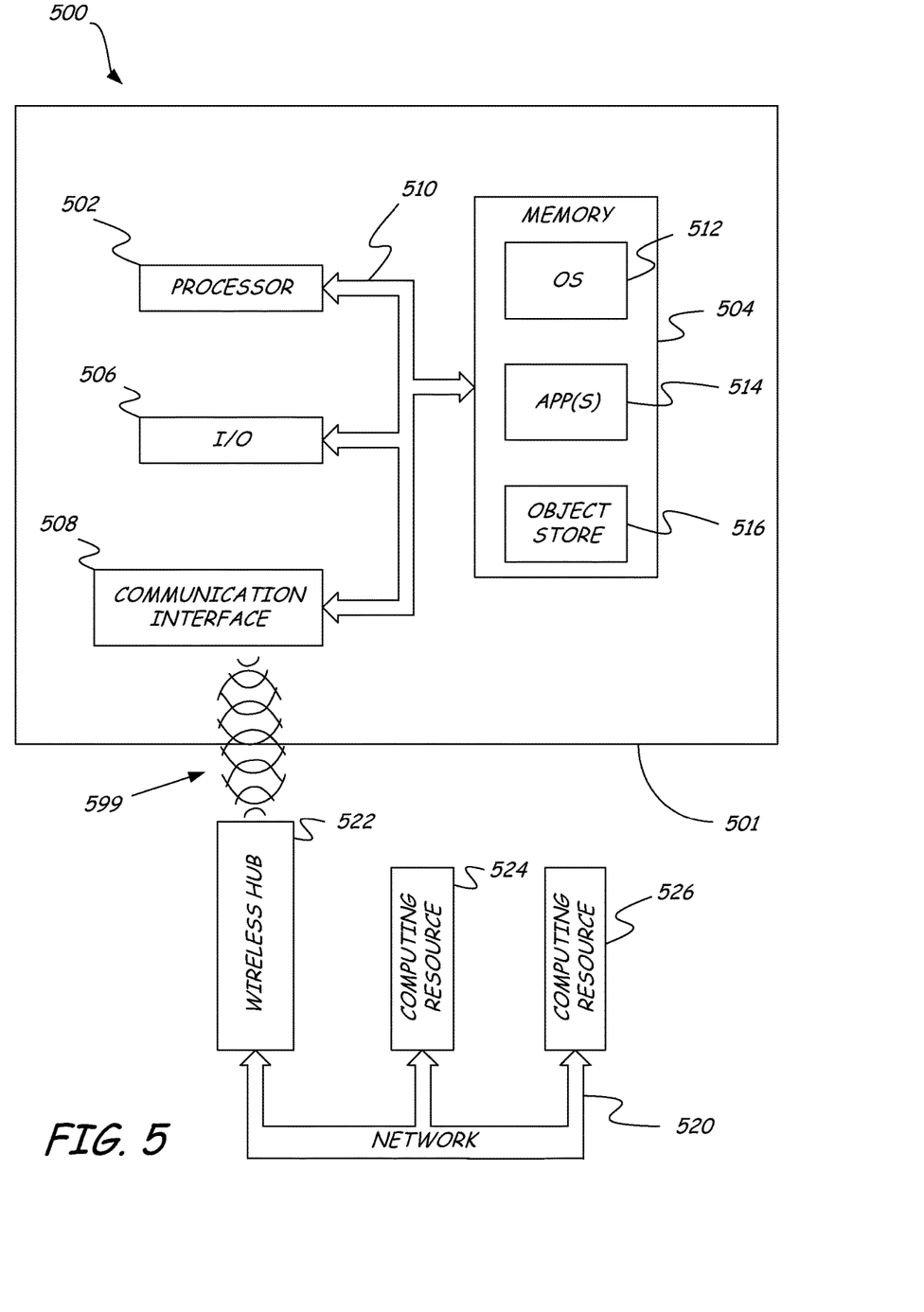
FIG. 5 depicts a block diagram of a mobile computing environment in which some embodiments may be practiced, according to an illustrative embodiment.

FIG. 5 depicts a block diagram of a general mobile computing environment, comprising a mobile computing device and a medium, readable by the mobile computing device and comprising executable instructions that are executable by the mobile computing device, according to another illustrative embodiment. FIG. 5 depicts a block diagram of a mobile computing system 500 including mobile device 501, according to an illustrative embodiment. Mobile device 501 includes a microprocessor 502, memory 504, input/output (I/O) components 506, and a communication interface 508 for communicating with remote computers or other mobile devices. In one embodiment, the aforementioned components may be coupled for communication with one another over a suitable bus 510.

Memory 504 is implemented as non-volatile electronic memory such as random access memory (RAM) with a battery back-up module (not shown) such that information stored in memory 504 is not lost when the general power to mobile device 500 is shut down. A portion of memory 504 is illustratively allocated as addressable memory for program execution, while another portion of memory 504 is illustratively used for storage, such as to simulate storage on a disk drive.

Memory 504 includes an operating system 512, application programs 514 as well as an object store 516. During operation, operating system 512 is illustratively executed by processor 502 from memory 504. Operating system 512, in one illustrative embodiment, is a WINDOWS® CE brand operating system commercially available from Microsoft Corporation. Operating system 512 is illustratively designed for mobile devices, and implements database features that can be utilized by applications 514 through a set of exposed application programming interfaces and methods. The objects in object store 516 are maintained by applications 514 and operating system 512, at least partially in response to calls to the exposed application programming interfaces and methods.

Communication interface 508 represents numerous devices and technologies that allow mobile device 500 to send and receive information. The devices include wired and wireless modems, satellite receivers and broadcast tuners to name a few. Mobile device 500 can also be directly connected to a computer to exchange data therewith. In such cases, communication interface 508 can be an infrared transceiver or a serial or parallel communication connection, all of which are capable of transmitting streaming information.

Input/output components 506 include a variety of input devices such as a touch-sensitive screen, buttons, rollers, and a microphone as well as a variety of output devices including an audio generator, a vibrating device, and a display. The devices listed above are by way of example and need not all be present on mobile device 500. In addition, other input/output devices may be attached to or found with mobile device 500.

Mobile computing system 500 also includes network 520. Mobile computing device 501 is illustratively in wireless communication with network 520—which may be the Internet, a wide area network, or a local area network, for example—by sending and receiving electromagnetic signals 599 of a suitable protocol between communication interface 508 and wireless interface 522. Wireless interface 522 may be a wireless hub or cellular antenna, for example, or any other signal interface. Wireless interface 522 in turn provides access via network 520 to a wide array of additional computing resources, illustratively represented by computing resources 524 and 526. Naturally, any number of computing devices in any locations may be in communicative connection with network 520. Computing device 501 is enabled to make use of executable instructions stored on the media of memory component 504, such as executable instructions that enable computing device 501 to implement various functions of automatic disambiguation based on a reference resource, in an illustrative embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, while the terms "computer", "computing device", or "computing system" may herein sometimes be used alone for convenience, it is well understood that each of these could refer to any computing device, computing system, computing environment, mobile device, or other information processing component or context, and is not limited to any individual interpretation. As another example, various embodiments may be applied to automatic disambiguation of documents or other files in English, Spanish, Chinese, or any other human language. As another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances while still remaining consistent with and encompassed by the elements defined by the claims herein.

What is claimed is:

1. A computing system comprising:
   a processor; and
   memory storing instructions which, when executed by the processor, configure the computing system to:
   identify a source text having a plurality of words;
   analyze the source text to identify a surface form in the source text, the surface form being an ambiguous orthographic representation of a proper name for an entity;
   based on the identification of the surface form in the source text, access a surface form record representing the surface form, the surface form record identifying at least a first named entity and a second named entity that are different from one another, and are each associated with the surface form and denoted by a proper name,
   wherein the surface form record comprises a first pointer to a first named entity record that is separate from the surface form record, the first named entity record corresponding to the first named entity and including a first set of context indicators that represents a context of the first named entity, and
   wherein the surface form record comprises a second pointer to a second named entity cord is separate from the surface form record, the second named entity record corresponding to the second named entity and including a second set of context indicators that represents a context of the second named entity;
use the first pointer to retrieve the first set of context indicators from the first named entity record;
generate a first correlation measure based on a number of occurrences in the source text of the first set of context indicators;
use the second pointer to retrieve the second set of context indicators from the second named entity record;
generate a second correlation measure based on a number of occurrences in the source text of the second set of context indicators;
based on a comparison of the first and second correlation measures, select one of the first or second named entities as corresponding to the surface form in the source text; and
generate a representation of a user interface display that displays the source text and visually associates the surface form and the selected named entity.

2. The computing system of claim 1, wherein the instructions configure the computing system to generate the user interface display to highlight the surface form and include a textual representation of the selected named entity displayed proximate the highlighted surface form.

3. The computing system of claim 1, wherein the surface form record is accessed in a surface form data store that stores a plurality of surface form records, each of the surface form records corresponding to a surface form that is an ambiguous orthographic representation of a proper name for an entity, and each of the surface form records having an indication of the corresponding surface form and indications of named entities that are associated with the surface form.

4. The computing system of claim 1, wherein the surface form comprises a first surface form in the source text, and wherein the instructions configure the computing system to:
identify a second surface form that overlaps the first surface form within the source text;
analyze the second surface form to select a third named entity corresponding to the second surface form;
determine that the named entity selected as corresponding to the first surface form has a higher correlation to the first surface form in than a correlation between the third named entity and the second surface form; and
generate the representation of the user interface display based on determination.

5. The computing system of claim 1, wherein the instructions configure the computing system to:
select one of the first named entity or the second named entity that is considered most correlated with the surface form in the source text based on the first and second correlation measures.

6. The computing system of claim 1, wherein the number of occurrences in the source text of the first set of context indicators is determined based on a comparison of the first set of context indicators to words in the source text, other than the surface form, and wherein the number occurrences in the source text of the second set of context indicators is determined based on a comparison of he second set of context indicators to words the source text, other than the surface form.

7. The computing system of claim 6 wherein the first correlation measure is based on a proximity of each occurrence of the first set of context indicators to the surface form in the source text, and the second correlation measure is based on a proximity of each occurrence of the second set of context indicators to the surface form in the source text.

8. The computing system of claim 1, wherein each of the first and second named entities comprise only one word that have different spellings from one another.

9. The computing system of claim 1, wherein at least one of the first or second named entities comprise multiple words, and wherein the first and second named entities have different spellings from one another.

10. The computing system of claim 1, wherein the first correlation measure is generated based on a weighting factor that applies different weights to at least one of:
different types of the context indicators;
proximity of the context indicators to the surface form of the named entity within the text;
a number of common labels; or
a number of links among each other of context indicators extracted from documents that link to or are linked from a document about an associated named entity.

11. The computing system of claim 1, wherein the surface form record includes a first entry that stores the first pointer, and a second entry that stores the second pointer.

12. The computing system claim 11, wherein the first and second named entity records are stored in a named entity data store and accessed based on the first and second pointers.

13. The computing system of claim 12, wherein the surface form record is stored in a surface form data store that is distinct from the named entity data store.

14. A computer-implemented method comprising:
identifying a portion of text having a plurality of words;
generating a representation of a user interface display that displays the portion of text;
identifying a polysemic word in the portion of text;
based on the identification of the polysemic word, accessing a surface form record representing the polysemic word, the surface form record identifying at least a first named entity and a second named entity that are different from one another and each associated with the polysemic word,
wherein the surface form record comprises a first pointer to a first named entity record that is separate from the surface form record, the first named entity record corresponding to the first named entity and including a first set of context indicators that represents a context of the first named entity, and
wherein the surface form record comprises a second pointer to a second named entity record that is separate from the surface form record, the second named entity record corresponding to the second named entity and including a second set of context indicators that represents a context of the second named entity;
based on the first pointer, retrieving the first set of context indicators from the first named entity record;
generating a first correlation measure based on a number of occurrences in the source text of the first set of context indicators;
based on the second pointer, retrieving the second set of context indicators from the second named entity record;
generating a second correlation measure based on a number of occurrences in the source text of the second set of context indicators;
based on a comparison of the first and second correlation measures, selecting one of the first or second named entities as corresponding to the polysemic word;

generate a representation of a user interface element in the user interface display that indicates that the selected named entity is associated with the portion of text.

15. The computer-implemented method of claim 14 wherein the portion of text is identified based on an indication of a user input that comprises at least one of:
    a user search input to perform a search that returns the portion of text; or
    a user content authoring input that authors the portion of text.

16. The computer-implemented method of claim 14, wherein the first and second named entities have different spellings from one another.

17. The computer-implemented method of claim 14, wherein the user interface element indicates that the selected named entity is associated with the portion of text by displaying selected named entity proximate the polysemic word.

18. A hardware computer-readable storage medium storing instructions which, when executed by a computer, perform a method comprising:
    receiving source text having a plurality of words;
    identifying, in the source text, a surface form that is an ambiguous orthographic representation of a proper name for an entity;
    based on the identification of the surface form in the source text, accessing a surface form record representing the surface form, the surface form record identifying at least a first named entity and a second named entity that are different from one another, and are each associated with the surface form and denoted by a proper name,
        wherein the surface form record comprises a first pointer to a first named entity record that is separate from the surface form record, the first named entity record corresponding to the first named entity and including a first set of context indicators that represents a context of the first named entity; and
        wherein the surface form record comprises a second pointer to a second named entity record that is separate from the surface form record, the second named entity record corresponding to the second named entity and including a second set of context indicators that represents a context of the second named entity;
    using the first pointer to retrieve the first set of context indicators from the first named entity record;
    generating a first correlation measure based on a number of occurrences in the source text of the first set of context indicators;
    using the second pointer to retrieve the second set of context indicators from the second named entity record;
    generating a second similarity measure based on a number of occurrences in the source text of the second set of context indicators;
    based on a comparison of the first and second correlation measures, selecting one of the first or second named entities as corresponding to the surface form in the source text; and
    generating a representation of a user interface element that indicates that the selected named entity is associated with the corresponding portion of text.

19. The hardware computer-readable storage medium of claim 18, the method further comprising:
    performing a first evaluation iteration that:
        selects a first portion of the source text based on a location of the surface form; and
        evaluates a first measure of similarity between the first portion and an entity indicator indicative of the named entity;
    performing a second evaluation iteration that:
        selects a second portion of the source text, the second portion including some, but not all, of the first portion; and
        evaluates a second measure of similarity between the second portion of text and the entity indicator indicative of the named entity, wherein the named entity s identified based on the second measure of similarity; and
    selecting the named entity as corresponding to the surface based on the first and second measures of similarity.

20. The hardware computer-readable storage medium of claim 19, wherein the first portion comprises a paragraph in the source text and the second portion comprises a sentence within the paragraph.

* * * * *